United States Patent

[11] 3,593,091

[72] Inventor Geoffrey A. Ross
 Canton Center, Conn.
[21] Appl. No. 818,878
[22] Filed Apr. 24, 1969
[45] Patented July 13, 1971
[73] Assignee Pratt & Whitney Inc.
 West Hartford, Conn.

[54] SYSTEM FOR POSITIONING MOVABLE MEMBERS WITH ABSOLUTE DIMENSION WITH SELECTABLE OFFSET POINT
 10 Claims, 10 Drawing Figs.
[52] U.S. Cl. .................................................. 318/572, 318/594
[51] Int. Cl. ..................................................... G05b 11/18
[50] Field of Search .......................................... 318/20.110, 20.120, 20.130, 20.260, 20.255

[56] References Cited
UNITED STATES PATENTS

| | | | |
|---|---|---|---|
| 3,183,421 | 5/1965 | Herchenroeder | 318/162 X |
| 3,218,532 | 11/1965 | Toscano | 318/28 |
| 3,270,186 | 8/1966 | Centner | 318/162 X |
| 3,209,221 | 9/1965 | Pugsley et al. | 318/28 UX |
| 3,473,009 | 10/1969 | Gerber et al. | 318/18 X |

Primary Examiner—Benjamin Dobeck
Attorney—Delio and Montgomery

ABSTRACT: A positioning system in which the actual position of a controlled member is always expressed in absolute dimension with respect to a fixed reference point and its position with respect to a second selectable reference or offset point is determined by subtracting the absolute value of the second reference point from the actual position of the controlled member.

PATENTED JUL 13 1971

INVENTOR
Geoffrey A. Ross

BY DeLio and Montgomery
ATTORNEYS

SYSTEM FOR POSITIONING MOVABLE MEMBERS WITH ABSOLUTE DIMENSION WITH SELECTABLE OFFSET POINT

This invention relates to positioning systems for machine tools, and more particularly relates to an absolute positioning system.

The present invention is particularly adapted for use in jig borers where very precise and accurate positioning is required.

In some machine tool-positioning systems a quantizer, which may be in the form of a rotating disc, provides pulses representative of movement. The pulses are used in conjunction with a position register to store the position of a machine part with respect to a given axis. Another position-indicating system is a device known as a resolver which compares through phase relations an actual position with a commanded position to provide an error.

Such systems work satisfactorily and are widely used. However, such systems are not absolute in the sense that they will remember the actual position of a machine part, such as a slide or saddle, when power is removed therefrom. For example, in a position register using active elements, such as transistors or other electronic switches, if power should be removed, the electronic switches are deenergized and the position of the machine part is lost. Accordingly, when a large piece of work is being acted upon and requires many operations, it is necessary to leave the control power on continuously whether the machine is in operation or not.

The present invention provides a new and improved control system in which the position of a slide may always be recognized as soon as control power is applied to the control system. The present invention further provides a positioning system which operates on an absolute system utilizing only two coordinate axes extending in one direction from a reference zero point and in which any given zero point may be selectively placed in the system to establish a reference point at any location on the workpiece within the range of the machine. The invention enhances the very precise positioning required in a jig borer and controls the velocity of the machine slides as a function of the existing error to provide a wide speed range and to rapidly and precisely bring the machine slides to a commanded position.

An object of this invention is to provide a new and improved positioning system for a machine tool.

Another object of this invention is to provide a machine tool-positioning system having new and improved means for continuously recognizing the position of the machine slides.

Another object of this invention is to provide machine tool-positioning system having new and improved means for predetermining a reference offset point.

A further object of this invention is to provide new and improved velocity control arrangement in a machine tool-positioning system.

The features of the invention which are believed to be novel are pointed out with particularity and distinctly claimed in the concluding portion of this specification. However the invention both as to its operation and organization, and together with further objects and advantages thereof may best be appreciated by reference to the following detailed description taken in conjunction with the drawings, in which:

FIG. 6 is a diagram in logical schematic form of a selection network utilized to determine the axes of movement for which numerical information will be interpolated;

Figures 1, 1A:
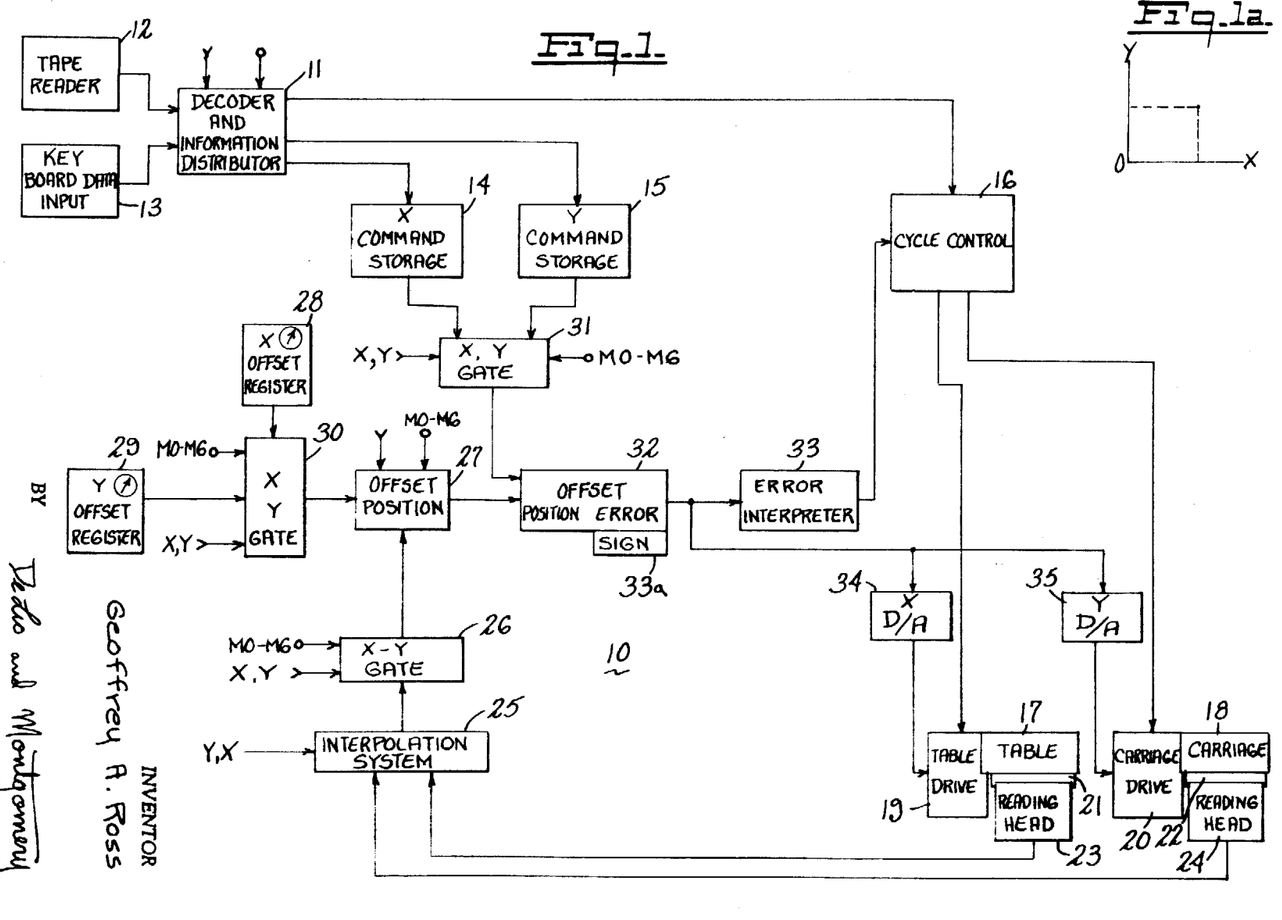
FIG. 1 is a block diagram of the overall system embodying the invention.
FIG. 1a is a graphical representation of the axes along which the controlled members of the machine may operate.

Referring now to the drawings. The system 10 generally comprises a decoder and information distributor 11, also known as a translator. The decoder and information distributor 11 may receive inputs from punched tape to a tape reader 12 or from a manual keyboard data input 13.

The decoder and information distributor applies the X-position and Y-position commands in binary coded decimal (BCD) forms to X-command register 14 and Y-command register 15. Registers 14 and 15 in the form of the invention illustrated are seven decade BCD static registers which are sampled least significant decade first by marker signals $M_0 - M_6$. Decoder 11 further distributes information to a G function or cycle control storage network 16.

The machine tool may be exemplified as having a table 17 and a carriage 18 movable along an X-Y axis as shown in FIG. 1a. The table is provided with a drive 19 and the carriage with a drive 20. Carried on the table and carriage are precision glass scales 21 and 22, respectively, each having a stationary reading head 23 and 24, respectively. The reading heads 23 and 24 will read the absolute positions on scales 21 and 22 with respect to a zero point along the X- and Y-axes, as exemplified in FIG. 1a. Associated with the scales and reading heads is an interpolation system 25. As exemplified this position readout system is an instrument called a DIG produced by General Measurement Research, Inc. and distributed by Automatic Gauges, Inc., Rochester, N.Y. The DIG consists of three elements, a precision glass scale, a compact reading head, and interpolation means for providing signals in a BCD format. As shown, the DIG head and scale are mounted on separate machine elements moving in relation to one another. The reading head optically scans the scale and makes absolute determination of position relative to a zero reference point on the scale. This information is applied to the interpolation system 25 which provides a seven decade digit BCD number for each reading head. This position information is selectively applied through X-Y gate 26 to a summer or subtractor 27. As herein described, the range is 99.99999 inches, a seven decade number.

Figures 2A, 2B, 3:
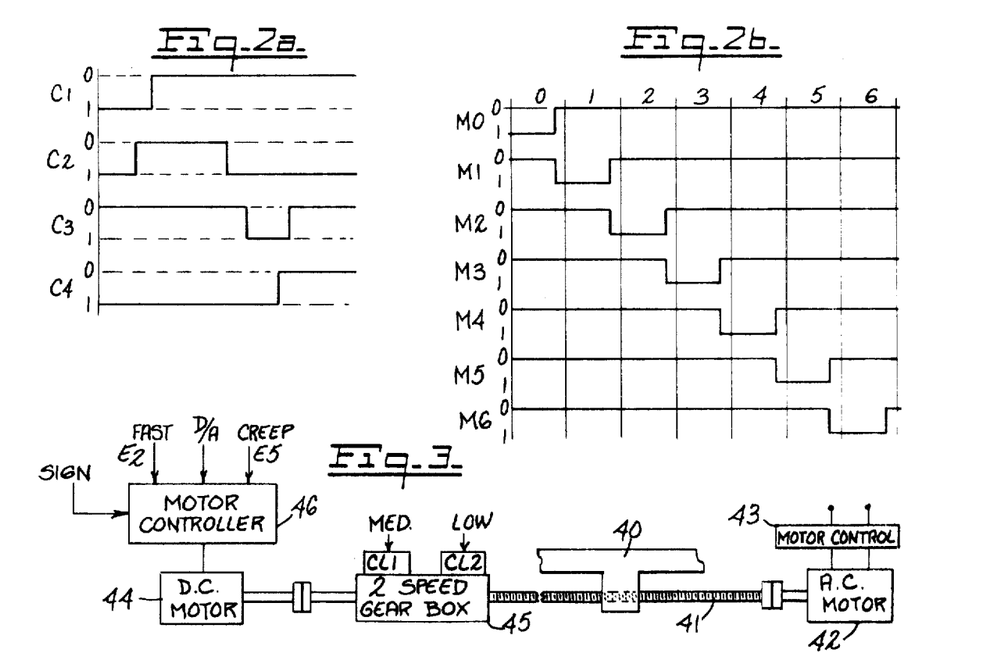
FIGS. 2a and 2b graphically represent timing signal waveforms.
FIG. 3 is a drawing of a drive system for the controlled members.

As will hereinafter be described, the sequencing of the seven BCD digits are under the control of marker signals $M_0 - M_6$ which form one marker cycle. Other control signals are derived from the cycle control network. Various clock signals are also utilized which are designated C1—C4 and four such clock signals comprise a clock cycle. Each marker has a duration of one clock cycle. Reference to FIG. 2a will show the form of the clock cycles and FIG. 2b exemplifies the relation of the marker signals thereto.

The clock signals are generated by a network as shown in the U.S. Pat. No. 3,417,303 of Johann Reuteler, assigned to the same assignee as the present invention. The markers are generated through use of a seven-stage shift register (not shown) which is shifted each clock cycle to successively produce a marker signal at each stage in a manner well known to those skilled in the art. As will hereinafter be made apparent, the clock signals C2 and C4 are generally used for gating and the signals C1 and C3 are used for resetting or setting purposes. The logic herein illustrated is of the NOR type, is exemplified in said U.S. Pat. No. 3,417,303.

The system further provides the function of providing a predetermined offset as a reference point for operation as, for example, the point X=5, Y=4, as shown in FIG. 1a. This may be accomplished for each axis by an X-offset register 28 and a Y-offset register 29. The offset devices are conventional converters which will convert a dial reading in decimal arabic form to a binary coded decimal number which, in this case, is a seven digit number. A suitable register is one termed a Digi- Switch and is manufactured by Digitran Co. of Pasadena, California. These numbers are set and stored in registers 28 and 29 and may be read out in the proper sequence during markers $M_0$—$M_6$ when X-Y selection gate 30 is opened.

In this regard, gates 26 and 30 are opened in synchronism so as to pass the X- or Y-numbers to summer 27. Summer 27 algebraically adds the X- and Y-offset coordinates to the number read from the DIG scale. The offset numbers are applied to summer 27 as negative numbers. Summer 27 comprises a seven decade binary coded decimal bidirectional adder having stages $2^2$–$2^5$ and the corresponding BCD decades are applied thereto from through gates 26 and 30. Gates 26 and 30 are selectively opened to pass either X- or Y-digits as is the gate 31. Gate 31 will selectively pass the X-commanded position or the Y-commanded position. Gates 26 and 30 will operate to pass the X-digits at the same time or the Y-digits at the same time. The output of summer 27 is read out serially as binary coded decades with marker signals $M_0$—$M_6$. This provides the offset position from the zero axis. This, in essence, gives an indication of where the table and carriage are located with respect to the offset coordinates rather than to the zero point, and thus allows the establishment of any reference point for positioning purposes. The commanded X-position and commanded Y-position are then compared with the offset position in a summer 32. The seven BCD digits are applied decade by decade, least significant decade first, to summer 32 from either register 14 or register 15 through gate 31 in timed relation with the output of summer 27. The output of summer 32 thus indicates the position error between the commanded position and the actual position as offset. Summer 32 includes sign means 33a for detecting a borrow or carry in the most significant position to indicate the direction of movement.

The magnitude of the position error which indicates the error between the commanded position and the offset actual position is applied to an error interpreter 33 which determines the magnitude of the error and so signifies to cycle control network 16.

In response to the magnitude of the error, the cycle control network 16 may command the table and/or carriage drive to traverse at a high rate, traverse at a medium rate, or place the traverse speed under the control of a digital-to-analog converter which controls the drive at a rate proportional to the magnitude of the error. The numerical position error in BCD form may be applied to digital-to-analog converters 34 and 35 for the X- and Y-axes, respectively, to drive the table and carriage at a rate proportional to the magnitude of the position errors when the error is in a predetermined range. As exemplified herein, the error interpreter will detect five errors or error ranges, hereinafter referred to as $E_1$, $E_2$, $E_3$, $E_4$ and $E_5$. For purposes of illustration, these errors will be considered as follows:

| Error: | Range, in. | Slide speed |
|---|---|---|
| $E_1$ | $\geq 1.5$ | Rapid. |
| $E_2$ | $<1.5, \leq 0.50$ | Fast. |
| $E_3$ | $<0.50, \leq 0.013$ | High $D/A$. |
| $E_4$ | $<0.013, \leq 0.0004$ | Low $D/A$. |
| $E_5$ | $<0.00, >0.0004$ | Creep. |

Each slide (table or carriage) is designated by the reference numeral 40 (FIG. 3) and is driven by a lead screw 41 which may be rotated at a rapid traverse rate by an AC motor 42 under control of a motor controller 43. When the error interpreter determines that the error has decreased to range $E_2$, the AC line contactors are opened and a DC motor 44 drives lead screw 41 through a two-speed gearbox 45 which includes clutches CL1 and CL2. When clutch CL1 is energized, gearbox 45 is connected for fast speed operation. Clutch CL1 is deenergized and clutch CL2 energized when the error has further decreased to a predetermined value as exemplified by error $E_3$. When the error has decreased to $E_3$, the motor controller 46 is placed under control of the digital-to-analog converter output voltages which are proportional to the existing position error. Then when the error decreases to point $E_2$, energization of the low speed clutch is changed and the slide velocity is further decreased. Still further, when the position error decreases to $E_5$, a signal indicative thereof is applied to motor controller 46 so that the lead screw 41 is rotated at a much lower creep feed until the position error is reduced to zero.

Figure 4:
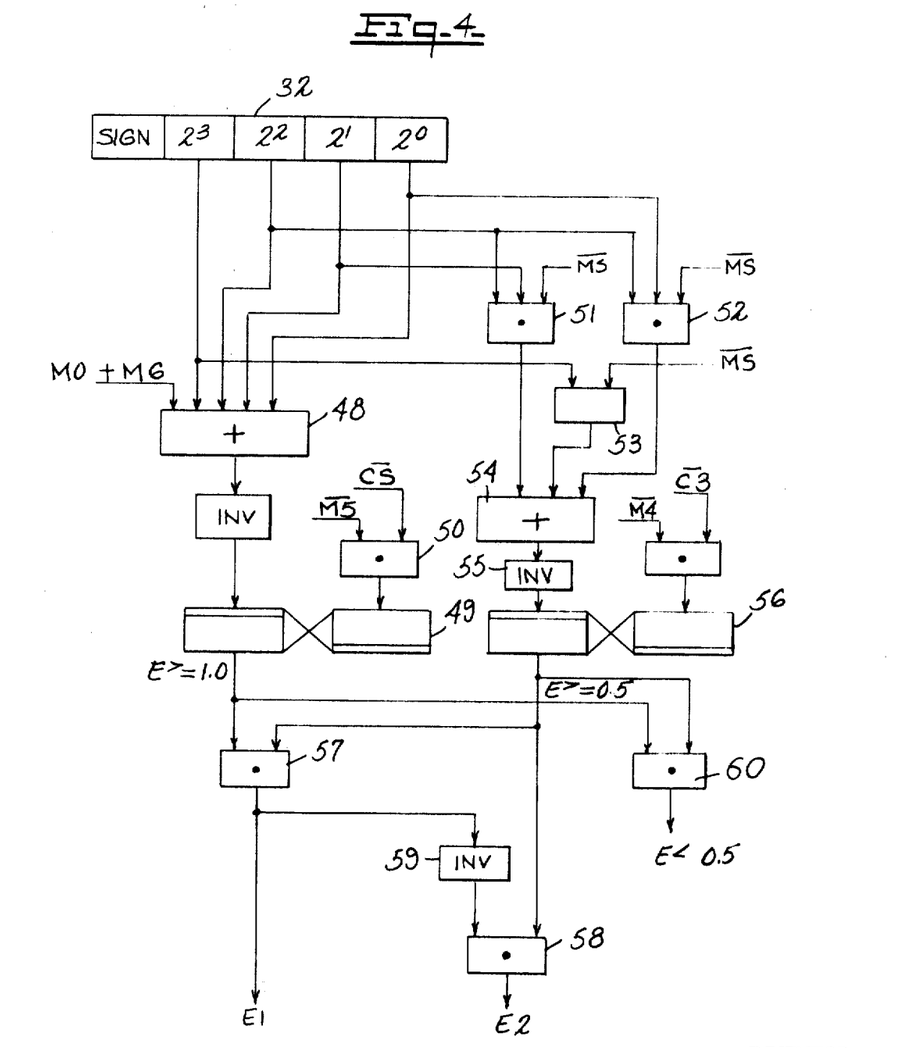
FIG. 4 is a diagram in logical schematic form of the error interpreter of FIG. 1.

The error interpreter is exemplified in schematic logical form in FIG. 4. The position error summer 32 is exemplified as a four-bit register. If at marker times $M_0$ and $M_6$ which correspond to the tens and unit digit of the error, respectively, there is decimal "1" or greater in summer 32, this will be detected by gate 48, and gate 48 will set memory 49. When memory 49 is set it indicates that at the last comparison of the offset position and the command, the error was greater than one.

Memory 49 will be reset just prior to the next $M_6$ marker at marker $\overline{M_5}$ and clock pulse $\overline{C3}$ through gate 50.

In a similar manner, gates 51, 52 and 53 will detect if the number in summer 32 is 5 or greater at marker time $M_5$ which corresponds to the tenths decade. If any of gates 51, 52 or 53 detects that at $M_5$ the number in register 32 is 5 or greater, gate 54 will set memory 56, at marker $\overline{M_5}$ through inversion gate 55.

When memory 56 is set it indicates that the error is equal to or greater than 0.5 inches. Memory 56 is reset at marker time $M_4$ at clock C3. Gate 57 will indicate when the error is 1.5 inches or greater. Gate 58 through inversion gate 59 will detect when the error is less than 1.5 inches and greater than or equal to 0.5 inches. Gate 60 will indicate when the error is less than 0.50 inches.

In a similar manner which is well known to one skilled in the art, the hundredths and thousandths decades of the error may be sampled at marker time $M_4$ and $M_3$ to detect when the error reaches 0.013 inches. Similarly, the ten-thousandths decade may be sampled at marker times $M_2$ and $M_1$ to determine when the error decreases to 0.0004 inches and the drive is to shift to creep speed.

Figure 5:
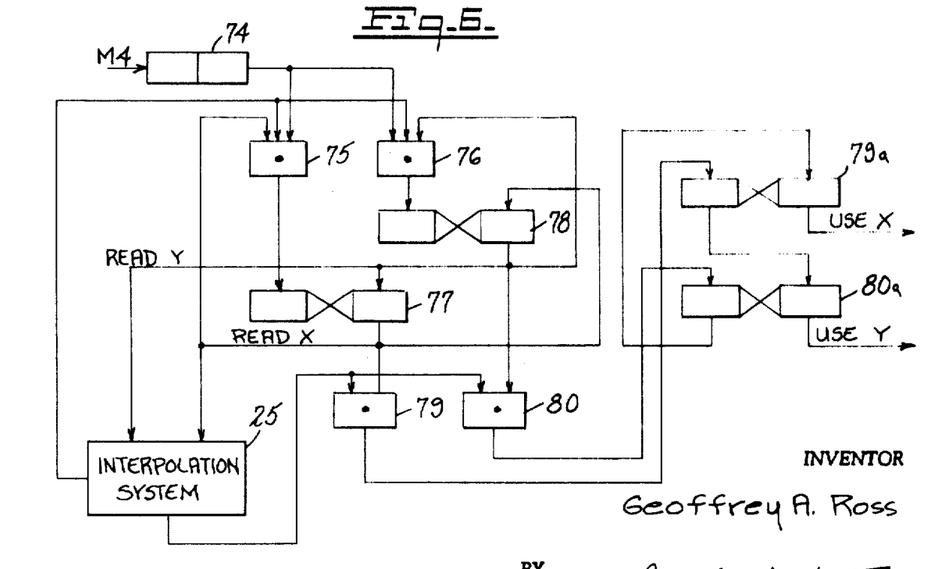
FIG. 5 is a diagram in logical schematic form of the controls for the drive system of FIG. 3.

Reference is now made to FIG. 5 which exemplifies the motor controls. In the final positioning of two slides, it is desired to bring one axis to zero error or to the set point and then move the other axis to its set point. A gate 61 is provided which detects when the Y-error $E_Y$ is less than 0.013 inches and the X-error is not zero, then gate 61 emits a signal which states "wait for X" to a Y-axis move memory 62. When memory 62 is set it will apply an inhibiting signal to gates 63 and 64 which, as will hereinafter be made apparent, will disable the Y-axis drive. Y-axis move memory 62 will also be set by a Y-set or Y-error equals zero signal and a signal from cycle memory 65 signifying that both X- and Y-slides are at the set point. At such time, cycle memory 65 will also apply a cycle complete signal to cycle control network 16. An X-move memory 66 will sense that an error exists in the X-axis and response thereto will apply enabling signals to gates 67 and 68. When gate 67 receives a signal from the X-axis move memory 66 and also a signal from error interpreter 33 that an X-axis error exists and the error is $E_1$, gate 67 will enable a relay driver 69 which will pick up a motor control relay and close the line to AC motor controller 46 thus permitting rapid traverse along the X-axis. A directional sign error derived from register 32 is further applied to motor controller 46 to determine the direction in which the X-slide will be moved at rapid traverse.

The operation of the Y-axis slide in rapid traverse is identical and need not be explained in detail.

If the error in the X-axis is $E_2$ such conditions are detected by gate 68 which will apply an indicative signal to motor controller 46 which will drive DC motor 44 at the fast traverse speed.

The output of X-move memory 66 is applied to a medium speed clutch control network 70 for clutch CL1 and to slow speed clutch control network 71 for clutch CL2. The clutch control networks are merely the conventional clutch energizing coils and associated circuitry therewith. So long as the X-error is in either the $E_2$ or $E_3$ range, control 70 will energize clutch CL1 for operation at fast traverse and in the high digital-to-analog range. These are signified by either the $E_2$ or $E_3$ signals. When an $E_2$ or $E_3$ signal is not received by clutch control network 70, clutch CL1 will be deenergized. Clutch CL2 is energized from clutch control 71 when the X-move memory 66 is set and the error is in range $E_4$ or $E_5$. The difference in the speeds provided by the gearbox is on the order of 10:1.

It will be noted that the interpolation system 25 performs the position interpolation for both axes. This requires a finite time. Accordingly, the overall position interpolation system alternately calculates the X-axis position error and the Y-axis position error, and applies the appropriate X- and Y-signals to interpolation system 25 and gates 26, 30 and 31. This alternate selection system is located in cycle control network 16 and may comprise a timing network in the form of a two-stage counter 74 (FIG. 6) which counts the M marker pulses and develops an overflow pulse every four marker cycles. These overflow pulses are applied to gates 75 and 76, each of which is adapted to set a memory 77 and 78, respectively. The network of FIG. 6 is arranged to remember which axis is being acted upon and at the next switching time to enable position interpolation for the other axes. Assume that the Y-axis interpolation is taking place which is exemplified by memory 78 being set. When memory 78 is set, it resets X-memory 77. When counter 74 again overflows it will apply signals to gates 75 and 76. However, gate 76 is inhibited by the set condition of memory 78, but gate 75 is enabled due to the reset condition of memory 77. Therefore, memory 77 will be set and simultaneously will reset memory 78.

Interpolator 25 receives a read X or read Y from memory 77 or 78 and upon receipt of such signal applies a signal over line 25a to inhibit gates 75 and 76 to prevent resetting of memories 77 and 78 until the conversion of the scale reading to BCD is complete. When such conversion is complete, an enabling signal is applied to gates 79 and 80. These gates then pass a signal to memories 79a or 80a. Memories 79a and 80a supply the X- and Y-control signals to gates 26, 30 and 31. When one of memories 79a or 80a is set it resets the other and they will remain in such condition until the other of gates 79 or 80 passes another setting signal.

This will not occur until counter 74 again overflows, or another specified time delay occurs. When the disabling signal applied to gates 75 and 76 by interpolator 25 is removed, memories 77 and 78 may change state. However, the state of memories 79a and 80a will not change until interpolator 25 completes its position calculations and enables gates 79 and 80.

The position interpolation time of interpolator 25 may be two or three marker cycles. Therefore, the time of overflow of counter 74 is made a sufficient number of marker cycles for summer 32 to calculate the new position error.

Figure 7:
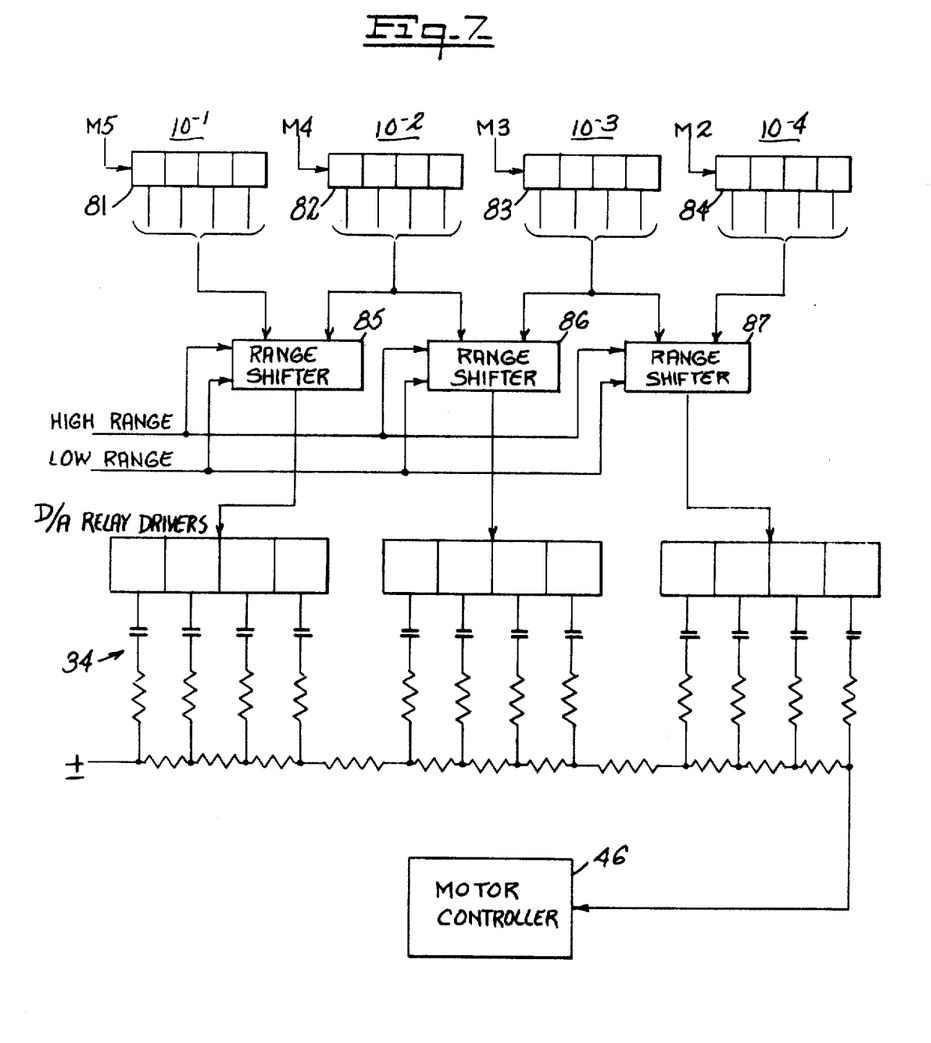
FIG. 7 is a diagram in logical schematic form exemplifying the manner in which the speed of the drive system is controlled in response to the interpreted magnitude of error.

As the decades of the error are determined by summer 32, the $10^{11}$, $10^{12}$, $10^{13}$, $10^{14}$ decades in BCD are applied to four-bit binary registers 81, 82, 83 and 84, FIG. 7. For each axis a BCD number is thereafter converted to analog form as, for example, for the X-axis by digital-to-analog converter 34, and are applied through range shifters 85, 86 and 87. The converted analog voltages are derived from only three of the decades of the error. In the high digital-to-analog range, the $10^{11}$, $10^{12}$, and $10^{13}$ decades are converted to an analog voltage and thereafter applied to motor controller 46. During the low range of D/A operation, when the error is in the $E_4$ range, the number appearing in the $10^{12}$, $10^{13}$ and $10^1$ decades are converted to an analog voltage and applied to motor controller 46.

Figure 8:
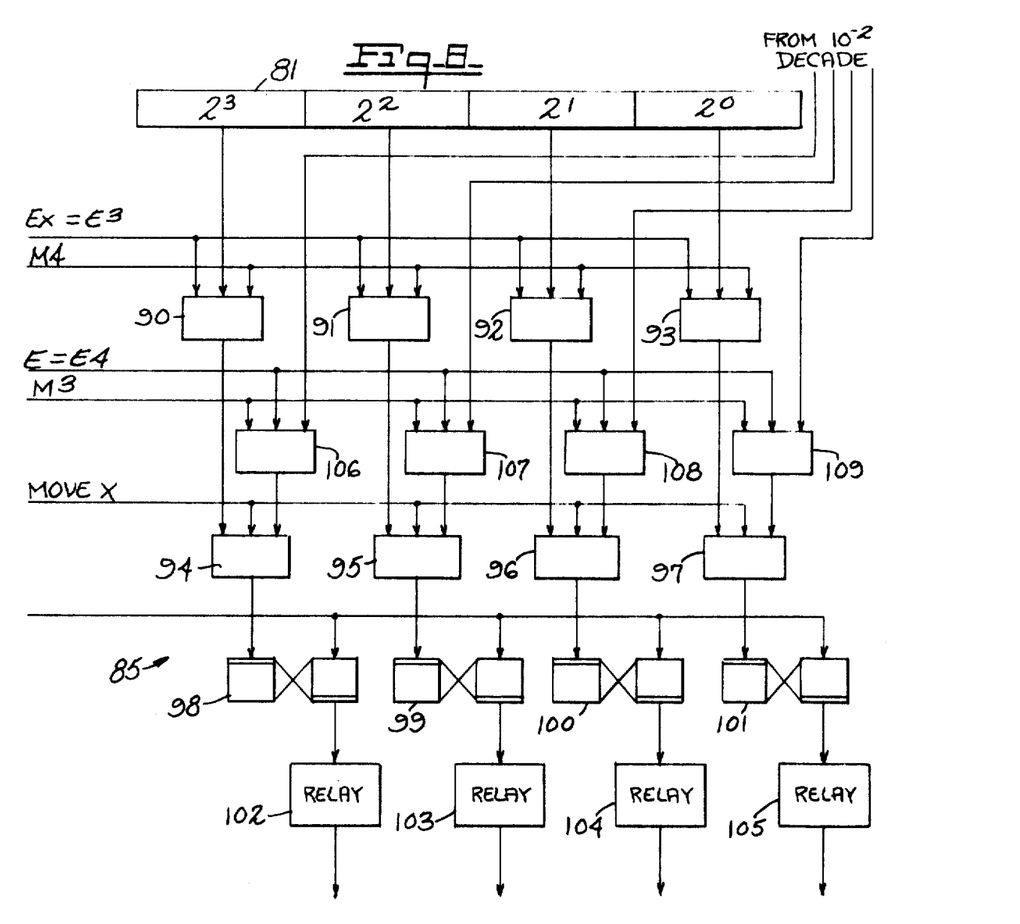
FIG. 8 is a diagram in logical schematic form exemplifying a part of FIG. 7 in more detail.

The operation of one of the range shifters 85 with respect to the $10^{11}$ and $10^{12}$ decades the X-axis and the digital-to-analog converter is shown in FIG. 8. The $10^{11}$ decade register 81 during the high range of digital-to-analog control operation is sampled at marker $M_3$ when the X-error is in the $E_3$ range by gates 90, 91, 92 and 93. When an output appears, they are transmitted through gates 94, 95, 96 and 97 so long as X-move memory 66 is set. When a signal is passed by gates 94—97 it sets a corresponding memory 98, 99, 100 and 101, respectively. When the memories 98—101 are set they will pick up a relay 102, 103, 104 and 105, respectively, to connect the appropriate resistance arms in circuit in the X-axis digital-to-analog converter.

When the position error has decreased to the $E_4$ range gates 90, 91, 92 and 93 are disabled and gates 106, 107, 108 and 109 pass the BCD of the $10^{12}$ decade.

This will detect the $10^{12}$ decade at marker $M_3$ when the error is in the $E_4$ range. In this manner, the range of the digital-to-analog converter is shifted one decade when the error range changes from $E_3$ to $E_4$. When this occurs, medium speed clutch CL1 is deenergized and slow speed clutch CL2 is energized.

With this arrangement the speed or velocity of the slides is controlled in accordance with the existing position error. In this manner, the slide position approaches its commanded end or set point with decreasing velocity and is precisely positioned in a minimum time.

The provision of the various speed ranges and in particular the high and low digital-to-analog converter in conjunction with the two-speed gearbox more than doubles the range of the DC motor control and further increases the range of the digital-to-analog converters one decade.

It may thus be seen that the objects of the invention set forth above as well as those made apparent from the preceding description are efficiently attained. A preferred embodiment of the invention has been set forth for purposes of disclosure. However, other embodiments of the invention as well as modifications to the disclosed embodiment may occur to those skilled in the art. Accordingly, the appended claims are intended to cover all embodiments and modifications of embodiment to the disclosed invention which do not depart from the spirit and scope thereof.

What I claim is:

1. A system for positioning two or more movable members along two more respective axes, comprising means providing numerical signals indicative of a commanded position of each member, means for reading the absolute position of each member with respect to its axis from a reference point, means responsive to said reading means for providing numerical signals indicative of said actual positions, means for establishing numerical signals indicative of offset positions of said members, first means for deriving numerical signals indicative of the difference between said absolute positions and said offset positions to derive a numerical position offset signal, second means for deriving numerical signals indicative of the difference in said position offset signal and said numerical command position signals to provide position error signals, and means for moving said members responsive to said position error signals.

2. The system of claim 1 wherein said first means alternately determines the numerical position offset signal for each axis, and means for alternately applying the actual position signals and the offset position signals for each axis thereto.

3. The system of claim 1, further including means for determining the magnitude of the position error of each member, and moving each member at a velocity which is a function of its position error.

4. The system of claim 1 wherein said first and second means are enabled to derive said differences periodically for each axis.

5. The system of claim 1 wherein said numerical signals indicative of said actual positions are applied to said first means as absolute numbers and said numerical signals indicative of said offset positions are applied thereto as negative numbers.

6. The system of claim 1 further including means for moving said members as a function of the magnitude of said position errors.

7. The system of claim 1 further including digital-to-analog converters for each axis adapted to connect said command position signals to analog voltages, a DC motor for moving each of said members, and means for driving said DC motors at speeds proportional to said analog voltages.

8. A drive system for moving a member at varying speed to a commanded position, comprising a driving member, means drivingly coupling said member to said driving member, means for determining the position error between the commanded position of the member and the actual position thereof and representing said error in digital form, a two-speed gearbox having clutches energizable to determine a high speed and a low speed, a DC motor for driving said driving member through said gearbox, control means for controlling the speed of said DC motor in response to the magnitude of a control signal applied thereto, a digital-to-analog converter, said converter being constructed and arranged to convert first and second predetermined weights of the error in digital form to an analog control signal, means for determining the magnitude of the position error, first means responsive to a predetermined magnitude of the position error for deenergizing said high speed clutch and energizing said low speed clutch, and second means responsive to said predetermined position error for shifting the weight of the digital number applied to said converter.

9. The system of claim 8 further including another motor for driving said driving member at a fixed rapid speed when said position error is above a second predetermined value greater than said predetermined magnitude.

10. The system of claim 8 further including means for applying a constant level speed control signal to said motor controller to drive said motor at a fixed fast speed when said position error is above a second predetermined value greater than said predetermined magnitude.

UNITED STATES PATENT OFFICE
CERTIFICATE OF CORRECTION

Patent No. 3,593,091                    Dated July 13, 1971

Inventor(s) Geoffrey A. Ross

It is certified that error appears in the above-identified patent and that said Letters Patent are hereby corrected as shown below:

Column 1, line 45, after "provide" insert -- a --. Column 2, line 19, "M-M" should read -- $M_0 - M_6$ --. Column 3, the Table should appear as shown below:

| Error | Range, in. | | Slide Speed |
|-------|-----------|---|-------------|
| E1 | $\geq 1.5$, | | Rapid |
| E2 | $< 1.5$, | $\geq 0.50$ | Fast |
| E3 | $< 0.50$, | $\geq 0.013$ | High D/A |
| E4 | $< 0.013$, | $\geq 0.0004$ | Low D/A |
| E5 | $< 0.00$, | $> 0.0004$ | Creep |

Column 5, line 52, "$10^{11}, 10^{12}, 10^{13}, 10^{14}$" should read
-- $10^{-1}, 10^{-2}, 10^{-3}, 10^{-4}$ --.

Column 5, line 59, "$10^{11}, 10^{12}, 10^{13}$" should read
-- $10^{-1}, 10^{-2}, 10^{-3}$ --.

UNITED STATES PATENT OFFICE
CERTIFICATE OF CORRECTION

Patent No.    3,593,091      Dated   July 13, 1971

Inventor(s)   Geoffrey A. Ross      PAGE - 2

It is certified that error appears in the above-identified patent and that said Letters Patent are hereby corrected as shown below:

Column 5, line 62, "$10^{12}$, $10^{13}$ and $10^{1}$" should read --$10^{-2}$, $10^{-3}$, $10^{-4}$--.

Column 5, line 66, "$10^{11}$, $10^{12}$" should read --$10^{-1}$, $10^{-2}$--.

Column 5, line 67, "$10^{11}$" should read --$10^{-1}$--.

Column 6, line 7, "$10^{12}$" should read --$10^{-2}$--.

Claim 1, line 2, after "two" insert --or--.

Signed and sealed this 3rd day of October 1972.

(SEAL)
Attest:

EDWARD M. FLETCHER, JR.
Attesting Officer

ROBERT GOTTSCHALK
Commissioner of Patents